(12) United States Patent
Sato et al.

(10) Patent No.: US 11,686,345 B2
(45) Date of Patent: Jun. 27, 2023

(54) ACTUATOR

(71) Applicant: SMC CORPORATION, Tokyo (JP)

(72) Inventors: Toshio Sato, Tsukuba (JP); Naoki Kouta, Katsushika-ku (JP); Masaki Miyahara, Moriya (JP); Masaki Imamura, Moriya (JP); Tsuyoshi Mita, Moriya (JP)

(73) Assignee: SMC CORPORATION, Tokyo (JP)

( * ) Notice: Subject to any disclaimer, the term of this patent is extended or adjusted under 35 U.S.C. 154(b) by 108 days.

(21) Appl. No.: 17/315,417

(22) Filed: May 10, 2021

(65) Prior Publication Data
US 2021/0355993 A1 Nov. 18, 2021

(30) Foreign Application Priority Data

May 14, 2020 (JP) .................................. 2020-085365
Apr. 16, 2021 (JP) .................................. 2021-069473

(51) Int. Cl.
*F16C 29/06* (2006.01)
*F16C 29/00* (2006.01)
*F16C 29/08* (2006.01)
*F16H 25/20* (2006.01)

(52) U.S. Cl.
CPC .......... *F16C 29/063* (2013.01); *F16C 29/005* (2013.01); *F16C 29/082* (2013.01); *F16H 2025/204* (2013.01)

(58) Field of Classification Search
CPC ........ F16C 29/005; F16C 29/04; F16C 29/06; F16C 29/0602; F16C 29/0607; F16C 29/063; F16C 29/082; F16H 2025/204
See application file for complete search history.

(56) References Cited

U.S. PATENT DOCUMENTS

| 1,500,116 A | * | 7/1924 | Dowd | ................... | F16C 29/041 |
| | | | | | 400/354.3 |
| 5,930,898 A | * | 8/1999 | Lyon | ..................... | F16C 29/005 |
| | | | | | 29/451 |
| 2002/0009241 A1 | | 1/2002 | Kahl | | |

(Continued)

FOREIGN PATENT DOCUMENTS

DE       100 16 606 A1    10/2001
DE   11 2016 004 620 T5    7/2018

(Continued)

OTHER PUBLICATIONS

Extended European Search Report dated Oct. 20, 2021 in corresponding European Patent Application No. 211726476, 8 pages.

(Continued)

*Primary Examiner* — Alan B Waits
(74) *Attorney, Agent, or Firm* — Obion, McClelland, Maier & Neustadt, L.L.P.

(57) ABSTRACT

An actuator is equipped with a body and a slider. Body side rail grooves are formed in side wall portions that constitute the body. On the other hand, slider side rail grooves are formed in the slider. Body side guide rails and slider side guide rails are provided in the body side rail grooves and the slider side rail grooves, respectively. Circular arc grooves serving as ball grooves are formed by body side ball receiving portions of the body side guide rails, and slider side ball receiving portions of the slider side guide rails.

12 Claims, 12 Drawing Sheets

(56) References Cited

U.S. PATENT DOCUMENTS

| | | | |
|---|---|---|---|
| 2008/0253703 A1* | 10/2008 | Michioka | F16C 29/04 384/49 |
| 2010/0139426 A1* | 6/2010 | Mori | F16C 33/60 74/89.32 |
| 2017/0276174 A1* | 9/2017 | Greiner | B23Q 3/15 |
| 2018/0283449 A1* | 10/2018 | Homma | F16C 29/002 |

FOREIGN PATENT DOCUMENTS

| | | |
|---|---|---|
| EP | 1 808 608 A1 | 7/2007 |
| JP | 61-180018 A | 8/1986 |
| JP | 2010-138981 A | 6/2010 |
| JP | 2014-126190 A | 7/2014 |
| JP | 2014-238134 A | 12/2014 |
| JP | 2015-161646 A | 9/2015 |
| JP | 2017-72196 A | 4/2017 |

OTHER PUBLICATIONS

Japanese Office Action dated Sep. 27, 2022 in Japanese Patent Application No. 2021-069473 (with unedited computer generated English translation), 6 pages.

\* cited by examiner

ACTUATOR

CROSS-REFERENCE TO RELATED APPLICATIONS

This application is based upon and claims the benefit of priority from Japanese Patent Applications No. 2020-085365 filed on May 14, 2020 and No. 2021-069473 filed on Apr. 16, 2021, the contents all of which are incorporated herein by reference.

BACKGROUND OF THE INVENTION

Field of the Invention

The present invention relates to an actuator having a body, and a slider that moves in an internal space inside the body.

Description of the Related Art

An actuator having a body, and a slider that moves in an internal space inside the body is widely used, for example, as a transport mechanism for transporting a workpiece. In this type of actuator, a table is provided on the slider, and the workpiece is retained on the table. The workpiece is transported accompanying the slider and the table being moved together integrally.

Ball grooves having a substantially semicircular cross section perpendicular to the direction of movement of the slider are formed respectively in the body and the slider, and balls made of bearing steel or the like are fitted in the ball grooves. By the balls rolling within the ball grooves, the slider moves smoothly. Further, the slider is provided with circulation passages for allowing the balls to circulate therein. The balls that have completed rolling inside the ball grooves are returned again to the ball grooves through the circulation passages.

The ball grooves are generally formed by cutting out portions of the body and the slider. In contrast thereto, as disclosed in Japanese Laid-Open Patent Publication No. 2010-138981 and Japanese Laid-Open Patent Publication No. 2014-126190, guide rails facing toward each other may be provided, respectively, on the body and the slider. In this case, rail grooves are formed respectively in each of the body and the slider, and guide rails having ball grooves formed therein in advance are fitted into the rail grooves. With the techniques disclosed in Japanese Laid-Open Patent Publication No. 2010-138981 and Japanese Laid-Open Patent Publication No. 2014-126190, after fitting of the guide rails, so-called "crimping" is carried out in which (metal material) locations of the body and the slider in the vicinity of the rail grooves are pushed out onto the sides of the guide rails, whereby the guide rails are prevented from falling out from the rail grooves.

SUMMARY OF THE INVENTION

Recently, attempts have been made to reduce the weight of the actuator. In order to achieve such a reduction in weight, it is considered effective to construct the body and the slider using a light metal. In this case, in a conventional technique in which the ball grooves are formed by cutting out the body and the slider, a concern arises in that sufficient rigidity cannot be secured in the vicinity of the ball grooves.

From this standpoint, it should be borne in mind that the guide rails disclosed in Japanese Laid-Open Patent Publication No. 2010-138981 and Japanese Laid-Open Patent Publication No. 2014-126190 are made of a metal material having sufficient rigidity. In this instance, in the actuators disclosed in Japanese Laid-Open Patent Publication No. 2010-138981 and Japanese Laid-Open Patent Publication No. 2014-126190, Gothic arch grooves are formed by two of the guide rails facing toward each other. In this case, if the guide rails become bent or warped, a defect occurs in that the operating resistance of the balls increases.

The present invention has devised in order to solve the aforementioned problem, and has the object of providing an actuator by which, even in the case that the guide rails become bent or warped, it is possible to avoid an increase in the operating resistance of the balls, and a reduction in the size and weight of the actuator can be achieved.

In order to achieve the aforementioned object, according to the present invention, provided is an actuator comprising:

a body including a base portion, and a first side wall portion and a second side wall portion provided on the base portion and facing toward each other, an internal space being defined by the base portion, the first side wall portion, and the second side wall portion;

a slider having a portion that moves inside the internal space; and a table provided on the slider and configured to be exposed from the internal space, wherein body side rail grooves are formed respectively on surfaces of the first side wall portion and the second side wall portion, the surfaces facing toward the internal space, slider side rail grooves are formed respectively on surfaces of the slider that face toward the body side rail grooves, body side guide rails are disposed in the body side rail grooves, and slider side guide rails are disposed in the slider side rail grooves, the body side guide rails include body side rail accommodated portions accommodated in the body side rail grooves, and body side ball receiving portions configured to be exposed from the body side rail grooves and curved in an arc shape, the slider side guide rails include slider side rail accommodated portions accommodated in the slider side rail grooves, and slider side ball receiving portions configured to be exposed from the slider side rail grooves, and forming circular arc grooves together with the body side ball receiving portions, balls are retained in the circular arc grooves, and the slider is provided with circulation passages configured to allow the balls to be circulated therein, and a dimension of the slider side guide rails in a vertical direction perpendicular to a direction of movement of the slider is greater than a dimension of the body side guide rails in the vertical direction perpendicular to the direction of movement of the slider.

According to the present invention, the circular arc grooves, which are formed by one pair of the body side guide rails and the slider side guide rails, are used as ball grooves. Therefore, even if the body side guide rails or the slider side guide rails become bent or warped, it is possible to suppress an increase in the operating resistance of the balls, in comparison with a case in which the ball grooves are formed from Gothic arch grooves.

Further, the body side guide rails are made smaller in size than the slider side guide rails. Therefore, it is possible to achieve a reduction in the size of the body in which the body side guide rails are provided. In addition, by the amount that the body is reduced in size, the weight of the body can also be reduced.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Preferred embodiments of an actuator according to the present invention will be presented and described in detail below with reference to the accompanying drawings. It should be noted that, in the following descriptions, the term "frontward" is a direction separating away from a motor 14 shown in FIG. 1, and the term "rearward" represents a direction approaching the motor 14. Further, the terms "up" and "down" are vertical directions perpendicular to a front-rear direction. Furthermore, the term "widthwise direction" is a horizontal direction perpendicular to the front-rear direction. Although the directions indicated above are shown in each of the drawings, such directions are provided for convenience in order to simplify the description and facilitate understanding, and should not be considered as specifying directions when the actuator is placed in actual use.

Figure 1:
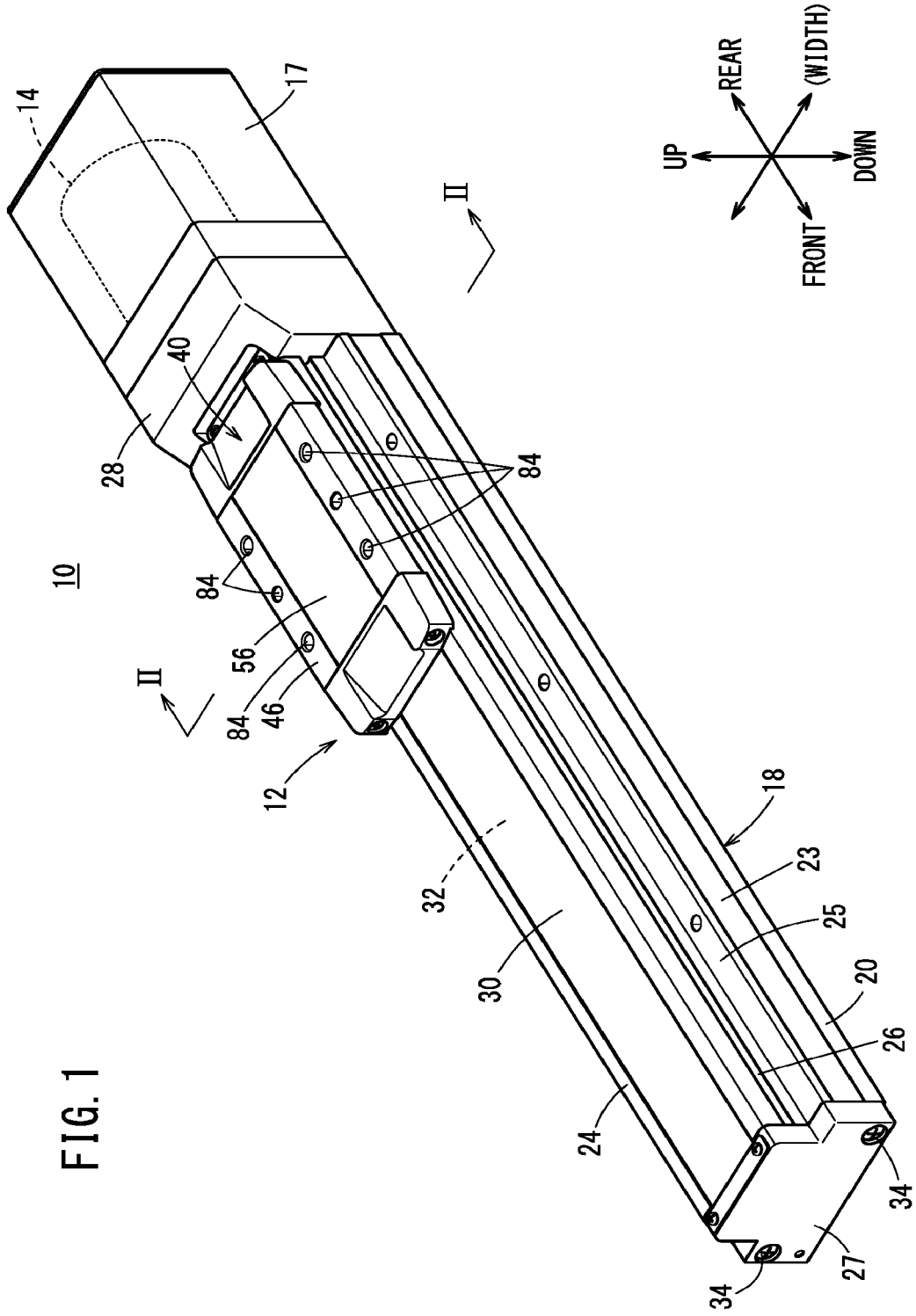
FIG. 1 is a schematic overall perspective view of an actuator according to a first embodiment of the present invention.

FIG. 1 is a schematic overall perspective view of an actuator 10 according to a first embodiment of the present invention. The actuator 10 is configured in the form of a linear actuator including a linear guide 12 that extends in the front-rear direction.

Further, the actuator 10 is equipped with the motor 14 serving as a driving unit, and a feed screw shaft 16 (see FIG. 2) that transmits a rotary driving power of the motor 14.

More specifically, the actuator 10 is an electric actuator. The motor 14 is accommodated inside a motor cover 17. On the other hand, the feed screw shaft 16 extends along the front-rear direction, and is connected, for example, through a coupling, to a motor shaft (neither of which is shown). Alternatively, the motor shaft itself may serve as the feed screw shaft 16. In this case, a coupling is not required.

Figure 2:
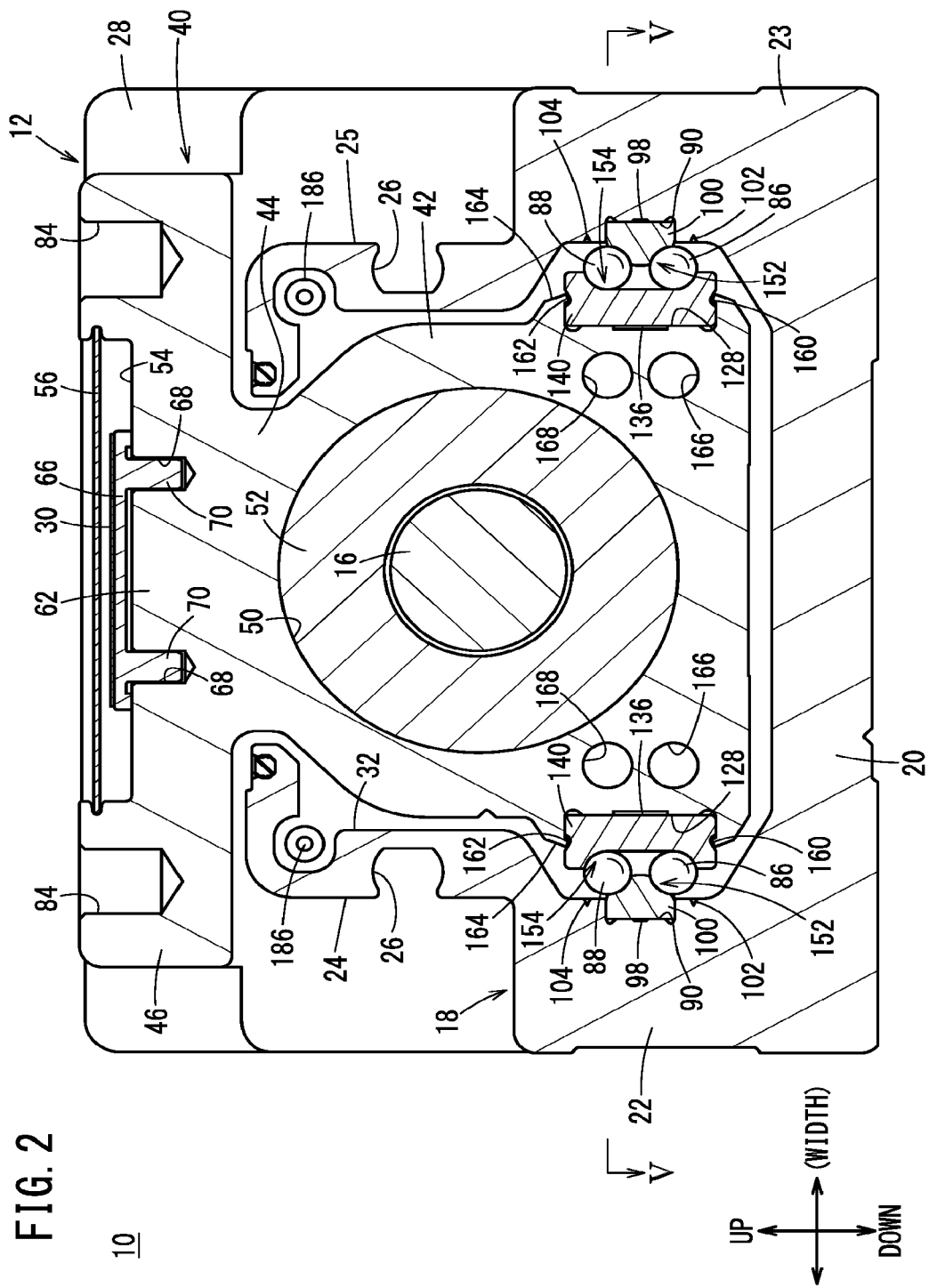
FIG. 2 is a cross-sectional view taken along line II-II of FIG. 1.

The linear guide 12 includes a body 18 that extends along an axial direction of the feed screw shaft 16, and more specifically, the front-rear direction. As shown in FIG. 2, the body 18 includes a base portion 20 constituting a substantially flat and elongated bottom portion, and a thick-walled first side wall portion 22 and a thick-walled second side wall portion 23 that are erected on an upper surface of the base portion 20. According to the first embodiment, the body 18 further includes a first protective wall portion 24 integrally connected with the first side wall portion 22, and a second protective wall portion 25 integrally connected with the second side wall portion 23. The first protective wall portion 24 and the second protective wall portion 25 extend upward (toward the side of a table 46, to be described later).

The first protective wall portion 24 projects out from an upper end of an inner edge portion of the first side wall portion 22, so as to be closer in proximity to the second side wall portion 23 than the first side wall portion 22. On the other hand, the second protective wall portion 25 projects out from an upper end of an inner edge portion of the second side wall portion 23, so as to be closer in proximity to the first side wall portion 22 than the second side wall portion 23. Therefore, the separation distance between the first protective wall portion 24 and the second protective wall portion 25 is smaller than the separation distance between the first side wall portion 22 and the second side wall portion 23.

A concave groove 26, which is recessed toward the second protective wall portion 25, is formed in the first protective wall portion 24, at a location midway from the first side wall portion 22 toward the table 46. Similarly, a concave groove 26, which is recessed toward the first protective wall portion 24, is formed in the second protective wall portion 25, at a location midway from the second side wall portion 23 toward the table 46.

A first end plate 27 and a second end plate 28, which extend from the first side wall portion 22 to the second side wall portion 23, are provided at a front end and a rear end of the base portion 20. The front end and the rear end are end portions in the direction of movement (see FIG. 1). Furthermore, on the upper surfaces of the first side wall portion 22 and the second side wall portion 23, a seal band 30, which closes an upper opening between the first side wall portion 22 and the second side wall portion 23, is provided to extend from the first end plate 27 to the second end plate 28. As shown in FIG. 2, in the interior of the body 18, an internal space 32 is defined, which is surrounded by the base portion 20, the first side wall portion 22, the second side wall portion 23, the first protective wall portion 24, the second protective wall portion 25, the first end plate 27, the second end plate 28, and the seal band 30. Both of the two concave grooves 26 are recessed toward the side of the internal space 32.

In the second end plate 28 (see FIG. 1), which closes a rearward opening of the body 18 communicating with the internal space 32, a non-illustrated insertion hole for passage of the feed screw shaft 16 is formed. On the other hand, the front first end plate 27 closes a frontward opening that communicates with the internal space 32. The first end plate 27 and the second end plate 28 are connected to the body 18 via connecting screws 34.

A slider main body 42 constituting a slider 40 is accommodated in the internal space 32 (see FIG. 2). Moreover, in addition to the slider main body 42, the slider 40 includes a neck portion 44 extending from the slider main body 42, and the table 46 which is provided on a distal end of the neck portion 44. The table 46 is exposed from the internal space 32, and is positioned above the seal band 30.

A circular-shaped nut arrangement hole 50 is formed in the slider main body 42. A cylindrical displacement nut 52 which is screw-engaged with the feed screw shaft 16 is arranged in the nut arrangement hole 50. Accompanying rotation of the feed screw shaft 16, the displacement nut 52 is displaced along the axial direction of the feed screw shaft 16.

The table 46 is formed to be wider than the slider main body 42. The table 46 exhibits a substantially U-shape having a bottom portion and two side portions in a front cross section along the widthwise direction. A concave space 54 defined between the bottom portion and the two side portions is closed by a flat plate-shaped cover plate 56.

Figure 3:
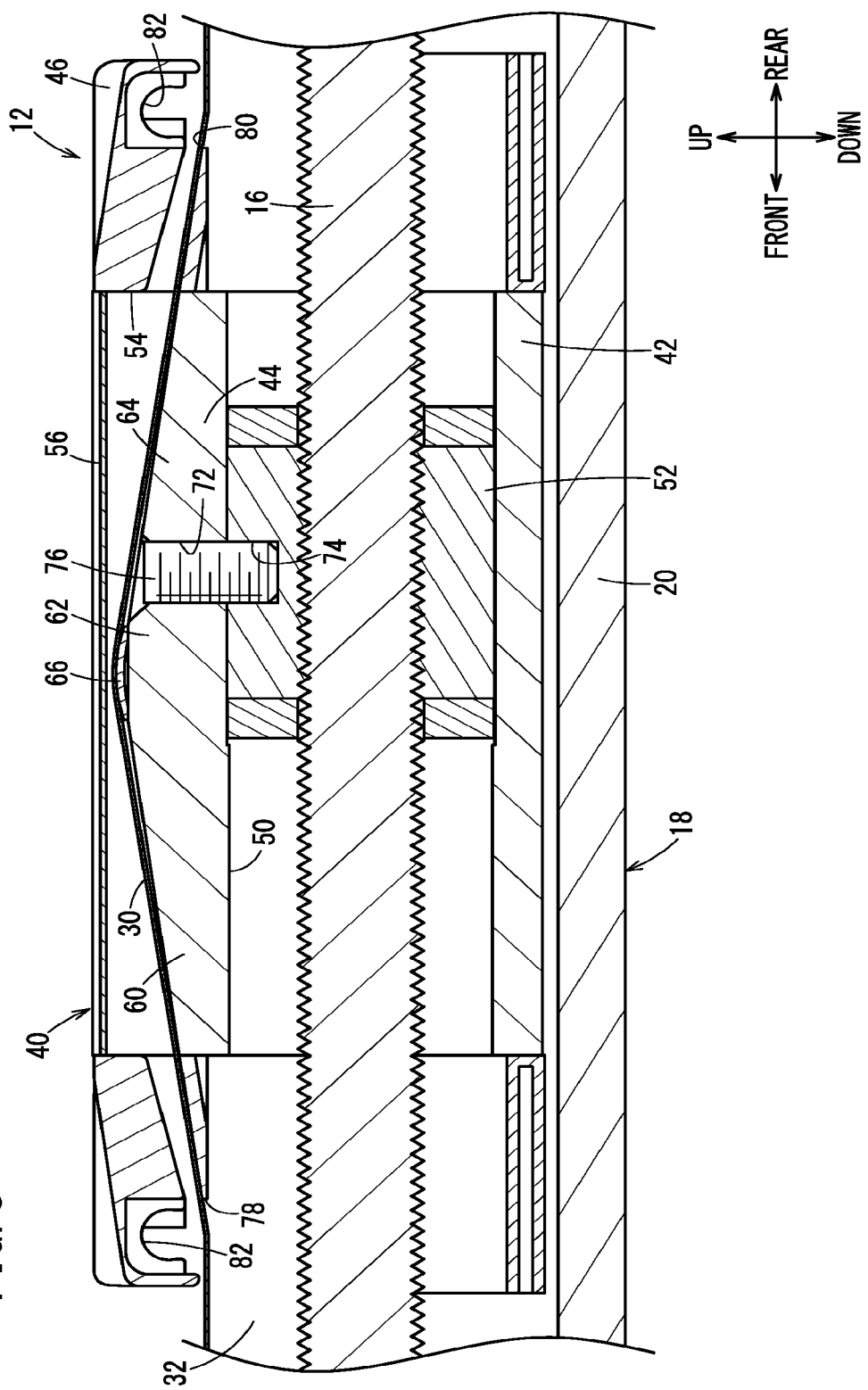
FIG. 3 is a side cross-sectional view of essential components of a linear guide constituting the actuator shown in FIG. 1.

As shown in FIG. 3, which is a side cross-sectional view of essential components of the linear guide 12, the bottom portion of the table 46 is made up from a frontward inclined portion 60 that is gently inclined upward from the front to the rear, a thickest portion 62, the top surface of which is flat and where the wall thickness is maximum within the bottom portion, and a rearward inclined portion 64 that is gently inclined downward from the front to the rear, and the bottom portion is formed in a substantially trapezoidal shape when viewed from the side. A guide plate 66, the top surface of which is rounded, is provided on the thickest portion 62. A pair of pin holes 68 facing toward the slider main body 42 are formed in the thickest portion 62, and insertion pin members 70 are formed so as to project out from a lower surface of the guide plate 66 (see FIG. 2). By fitting the insertion pin members 70 into the pin holes 68, the guide plate 66 is fixed in position.

Further, a bolt insertion hole 72 is formed in the rearward inclined portion 64 (see FIG. 3). On the other hand, a female screw hole 74 is formed in the displacement nut 52 at a position corresponding to the position of the bolt insertion hole 72. By screw-engagement of a connecting stud bolt 76, which has been passed through the bolt insertion hole 72, into the female screw hole 74, the displacement nut 52 is connected to the slider 40.

A front slit 78 and a rear slit 80 are formed, respectively, between the front end of the table 46 and the frontward inclined portion 60, and between the rearward inclined portion 64 and the rear end of the table 46. When the slider 40 is displaced (made to slide) with respect to the body 18, a portion of the seal band 30 in close proximity to the table 46 is passed through the front slit 78 and rides over the frontward inclined portion 60, and after having passed over the thickest portion 62 and the rearward inclined portion 64, is passed through the rear slit 80. More specifically, the portion of the seal band 30 in close proximity to the table 46 enters the concave space 54. Therefore, the slider 40 that undergoes displacement does not interfere with the seal band 30.

Moreover, a portion of the seal band 30 corresponding to the position of the thickest portion 62 rides over the rounded top surface of the guide plate 66. Consequently, the occurrence of bending and breakage of the seal band 30 is avoided. Further, the seal band 30 is pressed by non-illustrated pressing rollers which are retained in roller retaining holes 82 that are formed on a lower surface of the table 46.

A plurality of mounting holes 84 are formed on an upper surface of the table 46. A non-illustrated workpiece is retained on the upper surface of the table 46 via non-illustrated mounting bolts that are screw-engaged in the mounting holes 84.

As shown in FIG. 2, a plurality of vertically arranged first balls 86 and second balls 88 made of bearing steel or the like are interposed between the first side wall portion 22 and the slider 40, and between the slider 40 and the second side wall portion 23. A description will now be given concerning such a configuration.

Figure 4:
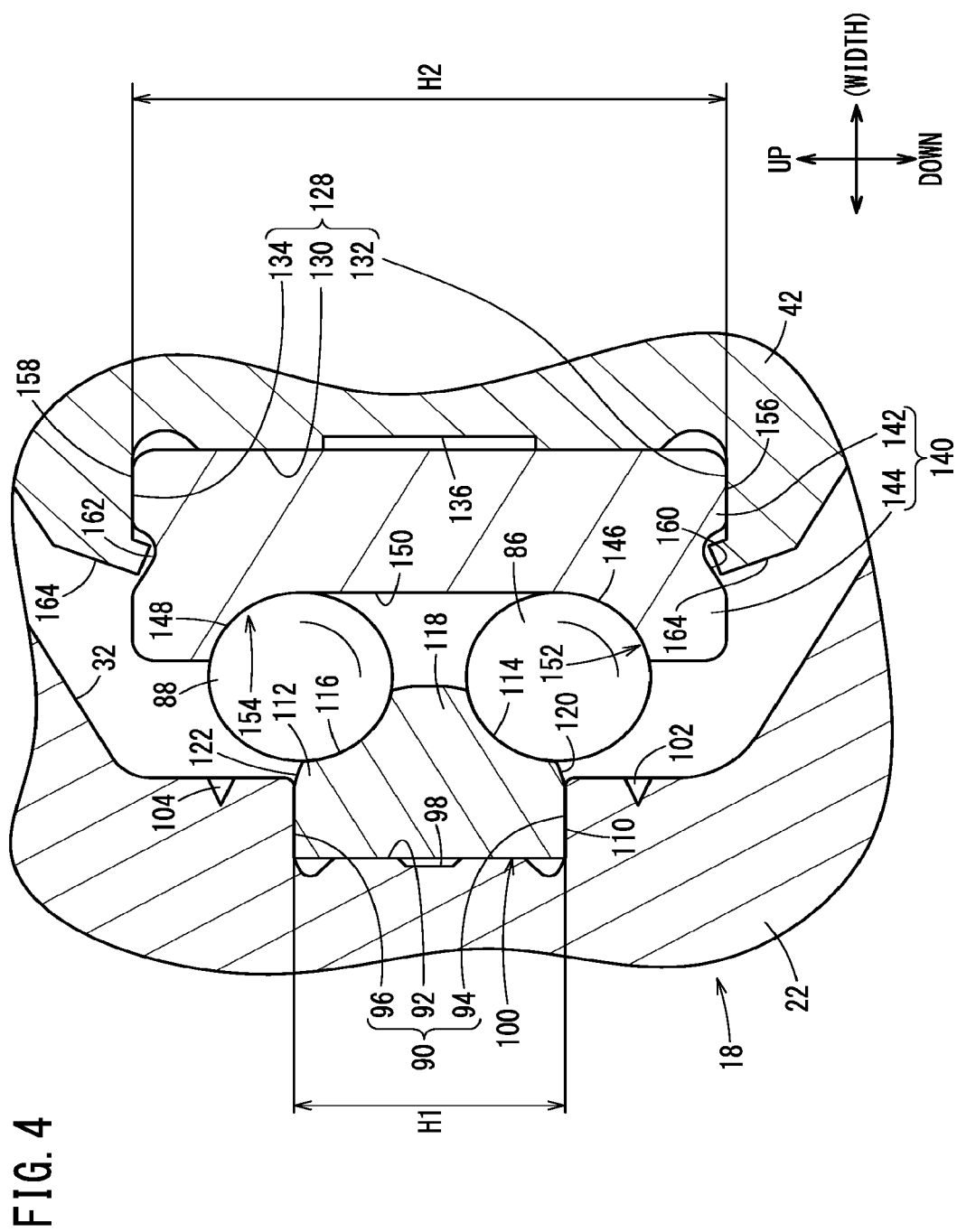
FIG. 4 is an enlarged view of essential components shown in FIG. 2.

As shown in detail in FIG. 4, in the vicinity of a lower end of the first side wall portion 22, a body side rail groove 90 that extends along the front-rear direction is formed on an inner surface facing toward the internal space 32. The body side rail groove 90 opens so as to face the internal space 32, and is recessed in a direction away from the internal space 32 (outwardly in the widthwise direction). Accordingly, a bottom surface 92 of the body side rail groove 90 is a vertical surface extending along an upward/downward direction. Further, side surfaces of the body side rail groove 90 are a lower horizontal surface 94 and an upper horizontal surface 96 extending from the opening toward the bottom surface 92. A corner portion between the bottom surface 92 and the lower horizontal surface 94, and a corner portion between the bottom surface 92 and the upper horizontal surface 96 are chamfered.

A recessed portion 98, which is recessed outwardly in the widthwise direction, is formed on the bottom surface 92 of the body side rail groove 90. The recessed portion 98 may be filled with an adhesive for retaining a body side guide rail 100, to be described later.

A first notch 102 and a second notch 104 are formed in the vicinity of the body side rail groove 90 in the first side wall portion 22 so as to sandwich the body side rail groove 90 from above and below. The first notch 102 and the second notch 104 extend along the front-rear direction in the same manner as the body side rail groove 90, and lie substantially in parallel with the body side rail groove 90. The first notch 102 and the second notch 104, as will be described later, are formed as movement locus marks for a crimping roller 106 (see FIG. 7).

The body side guide rail 100 is disposed in the body side rail groove 90. A (metal material) portion of the first side wall portion 22 in close proximity to the body side rail groove 90 is pushed out onto the body side rail groove 90, and as a result, the body side guide rail 100 is stopped from coming out (prevented from falling out) from the body side rail groove 90. Stated otherwise, due to such crimping of the body 18, the body side guide rail 100 is retained in the body side rail groove 90. This feature will be described later.

The body side guide rail 100 includes a body side rail accommodated portion 110 accommodated in the body side rail groove 90, and a body side rail exposed portion 112 which is exposed from the body side rail groove 90. Among these portions, the body side rail exposed portion 112 includes a first ball receiving portion 114 and a second ball receiving portion 116 (both of which are body side ball receiving portions) having arc shapes that are approximately ¼ of a perfect circle. Further, a protruding end portion 118 that projects toward the slider main body 42 is interposed between the first ball receiving portion 114 and the second ball receiving portion 116. The protruding end portion 118 enters in between the first balls 86 and the second balls 88, thereby forming a predetermined clearance between the first balls 86 and the second balls 88.

Further, between the first ball receiving portion 114 and the body side rail accommodated portion 110, and between the second ball receiving portion 116 and the body side rail accommodated portion 110, there are respectively formed a first inclined surface 120 and a second inclined surface 122, which approach each other as they proceed from the body side rail accommodated portion 110 toward the first and second ball receiving portions 114 and 116. By interposing the first inclined surface 120 and the second inclined surface 122 therebetween, a wall thickness between the first ball receiving portion 114 and the body side rail accommodated portion 110, and a wall thickness between the second ball receiving portion 116 and the body side rail accommodated portion 110 gradually change. More specifically, the wall thickness of the body side rail groove 90 becomes smaller as the body side rail accommodated portion 110 comes closer in proximity to the first ball receiving portion 114 and the second ball receiving portion 116.

On the other hand, a slider side rail groove 128 is formed at a position in the slider 40 facing toward the body side rail groove 90. More specifically, the slider side rail groove 128 opens so as to face toward the body side rail groove 90, and is recessed in a direction away from the internal space 32 (inwardly in the widthwise direction). Accordingly, a bottom surface 130 of the slider side rail groove 128 is also a vertical surface extending along the upward/downward direction, and a lower horizontal surface 132 and an upper horizontal surface 134 extending from the opening to the bottom surface 130 are side surfaces. A corner portion between the bottom surface 130 and the lower horizontal surface 132, and a corner portion between the bottom surface 130 and the upper horizontal surface 134 are chamfered.

A recessed portion 136, which is recessed inwardly in the widthwise direction, may be formed on the bottom surface 130 of the slider side rail groove 128. The recessed portion 136 may also be filled with an adhesive for retaining a slider side guide rail 140.

The slider side guide rail 140 is disposed in the slider side rail groove 128. A dimension in the heightwise direction of the opening of the slider side rail groove 128 is substantially equivalent to a dimension in the heightwise direction of the slider side guide rail 140 (approximately the same dimension as a dimension H2 described later). In addition, after the slider side guide rail 140 has been fitted into the slider side rail groove 128, later-described inclined portions 164 are crimped so as to be crushed toward the side of the slider side rail groove 128. Due to such crimping, the slider side guide rail 140 is retained inside the slider side rail groove 128, and the slider side guide rail 140 is stopped from coming out (prevented from falling out) from the slider side rail groove 128.

The slider side guide rail 140 includes a slider side rail accommodated portion 142 accommodated in the slider side rail groove 128, and a slider side rail exposed portion 144 which is exposed from the slider side rail groove 128. The slider side rail exposed portion 144 includes a third ball receiving portion 146 and a fourth ball receiving portion 148 (both of which are slider side ball receiving portions) having arc shapes that are approximately ¼ of a perfect circle. The third ball receiving portion 146 faces toward the first ball receiving portion 114, and the fourth ball receiving portion 148 faces toward the second ball receiving portion 116. A flat portion 150 is interposed between the third ball receiving portion 146 and the fourth ball receiving portion 148.

In this instance, the dimension H2 in the heightwise direction (a direction perpendicular to the direction of movement of the slider 40) of the slider side guide rail 140 is greater than a dimension H1 in the heightwise direction of the body side guide rail 100. Accordingly, the third ball receiving portion 146 is positioned below the first ball receiving portion 114, and the fourth ball receiving portion 148 is positioned above the second ball receiving portion 116. As a result of the first ball receiving portion 114 and the third ball receiving portion 146, as well as the second ball receiving portion 116 and the fourth ball receiving portion 148 having such a positional relationship, a first circular arc groove 152 is formed by the first ball receiving portion 114 and the third ball receiving portion 146, and a second circular arc groove 154 is formed by the second ball receiving portion 116 and the fourth ball receiving portion 148.

More specifically, in the first embodiment, two circular arc grooves (the first circular arc groove 152 and the second circular arc groove 154) which are arranged above and below are formed. The first balls 86 and the second balls 88 individually roll along the first circular arc groove 152 and the second circular arc groove 154. Stated otherwise, the first circular arc groove 152 and the second circular arc groove 154 are both ball grooves.

On the slider side rail accommodated portion 142 that constitutes the slider side guide rail 140, a first depression 160 and a second depression 162 are formed, respectively, on surfaces, namely, a lower surface 156 and an upper surface 158, which face toward side surfaces (the lower horizontal surface 132 and the upper horizontal surface 134) of the slider side rail groove 128. The first depression 160 is of an upwardly recessed concave shape, and the second depression 162 is of a downwardly recessed concave shape. The first depression 160 and the second depression 162 are formed prior to the slider side guide rail 140 being fitted into the slider side rail groove 128. Portions of the first depression 160 and the second depression 162 may be exposed from the slider side rail groove 128.

Portions of the slider 40 on which the slider side rail grooves 128 are formed are inclined portions 164, the thickness of which decreases as they become closer in proximity to the opening from the bottom surface 130 of the slider side rail groove 128. More specifically, the wall thickness of the inclined portions 164 becomes smallest in the vicinity of the opening of the slider side rail groove 128. Distal ends of the inclined portions 164 are bent toward the first depression 160 and the second depression 162, and therefore, enter the first depression 160 and the second depression 162.

Figure 5:
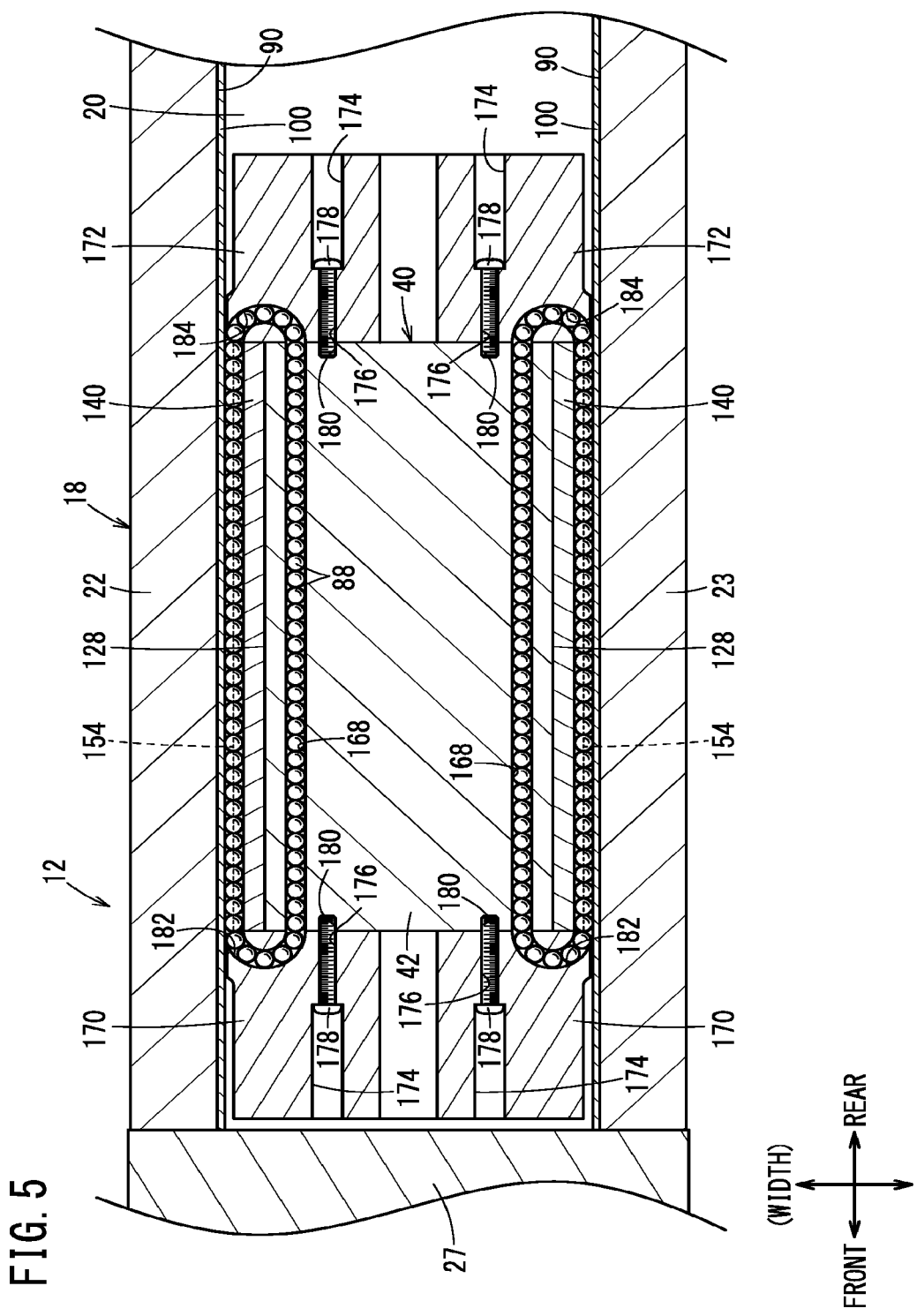
FIG. 5 is a cross-sectional view taken along line V-V of FIG. 2.

Further, first circulation passages 166 and second circulation passages 168 for individually allowing the first balls 86 and the second balls 88 to circulate therethrough are formed in the slider main body 42 (see FIG. 2). In addition, as shown in FIG. 5, first return caps 170 and second return caps 172 are provided, respectively, on a front portion and a rear portion of the slider main body 42. More specifically, stopper holes 174 and screw passage holes 176 connected to the stopper holes 174 are formed in the first return caps 170 and the second return caps 172. In addition, shaft portions of mounting screws 178 are passed through the screw passage holes 176 and screwed-engaged with screw holes 180 that are formed in the slider main body 42. In accordance with such screw-engagement, the first return caps 170 and the second return caps 172 are attached to the slider main body 42. Moreover, head portions of the mounting screws 178 are blocked and held back by the bottom surfaces of the stopper holes 174.

Non-illustrated first U-shaped passages in communication with the first circular arc grooves 152 and the first circulation passages 166, and second U-shaped passages 182 in communication with the second circular arc grooves 154 and the second circulation passages 168 are formed respectively in the first return caps 170. Similarly, non-illustrated third U-shaped passages in communication with the first circular arc grooves 152 and the first circulation passages 166, and fourth U-shaped passages 184 in communication with the second circular arc grooves 154 and the second circulation passages 168 are formed respectively in the second return caps 172. The first U-shaped passages and the third U-shaped passages are positioned below the second U-shaped passages 182 and the fourth U-shaped passages 184, respectively.

The first balls 86 that have rolled through the first circular arc grooves 152 pass through the first U-shaped passages or the third U-shaped passages, and are returned to the first circular arc grooves 152 via the first circulation passages 166. Similarly, the second balls 88 that have rolled through the second circular arc grooves 154 pass through the second U-shaped passages 182 or the fourth U-shaped passages 184, and are returned to the second circular arc grooves 154 via the second circulation passages 168. By repeating these actions, the first balls 86 and the second balls 88 are circulated.

Concerning the configuration described above, the features thereof are the same also in regards to the slider main body 42 and the second side wall portion 23. Accordingly, constituent elements thereof, which are the same as the above-described constituent elements, are designated with the same reference numerals, and detailed description thereof is omitted.

In the first embodiment, the body 18 and the slider 40 are made of a light metal. As preferred examples of such light metals, there may be cited aluminum or aluminum alloys, which are especially lightweight, inexpensive, and easily molded. On the other hand, the body side guide rail 100 and the slider side guide rail 140 are made of a metal material having excellent rigidity. Specific examples of this type of metal material include iron based metals such as stainless steel or the like. Aluminum or aluminum alloys and stainless steel also have the advantage of possessing good corrosion resistance.

Moreover, reference numeral 186 in FIG. 2 indicates a dust collecting pipe for drawing in dust or the like generated within the internal space 32, and discharging the dust or the like to the exterior of the actuator 10.

The actuator 10 according to the first embodiment is basically configured to include the linear guide 12 which is configured in the manner described above. Next, actions and effects of the actuator 10 will be described.

In a manufacturing process for the actuator 10, the body side guide rail 100 and the slider side guide rail 140 are manufactured by drawing, rolling, or the like. In this instance, when stepped portions 190 are provided respectively between a body side rail accommodated portion 110a and a first ball receiving portion 114a and between the body side rail accommodated portion 110a and a second ball receiving portion 116a, as in a body side guide rail 100a shown in FIG. 6, the shape thereof becomes complicated. It is difficult to manufacture the body side guide rail 100a having such a shape by drawing, rolling, or the like. In contrast thereto, as shown in FIG. 4, by providing the first inclined surface 120 and the second inclined surface 122 respectively between the body side rail accommodated portion 110 and the first ball receiving portion 114 and between the body side rail accommodated portion 110 and the second ball receiving portion 116, the body side guide rail 100 can be manufactured with a simple shape. In addition, the body side guide rail 100 can be easily obtained by drawing, rolling, or the like.

The body side rail accommodated portions 110 of the body side guide rails 100 are fitted into the body side rail grooves 90, which have been formed in advance in the first side wall portion 22 and the second side wall portion 23 that make up the body 18. As noted previously, the recessed portions 98 may be filled beforehand with an adhesive.

Figure 7:
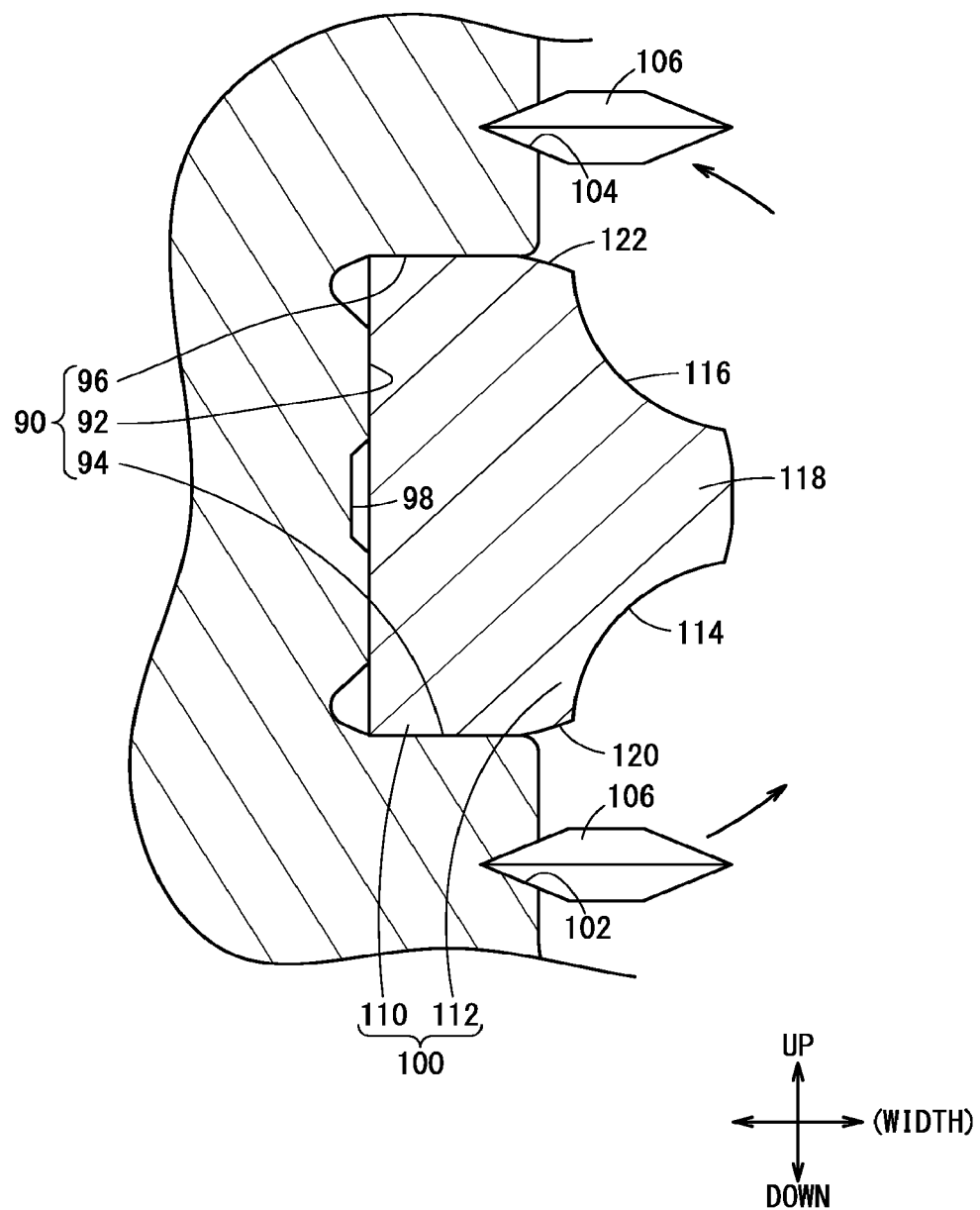
FIG. 7 is a front cross-sectional view of essential components showing a state in which the body is crimped by a crimping roller.

Thereafter, as shown in FIG. 7, the crimping roller 106 is used. More specifically, the crimping roller 106 is pressed against a lower side of the body side rail groove 90 on the front end side (or alternatively, the rear end side) of an inner surface of the first side wall portion 22 to apply pressure to the same. Due to the pressure applying action of the crimping roller 106, the inner surface of the first side wall portion 22 is plastically deformed. More specifically, the crimping roller 106 that has been pressed into the inner surface of the first side wall portion 22 is displaced in parallel with the body side rail groove 90, whereby a portion of the metal material on the inner surface is pushed out upwardly toward the body side rail groove 90. As a result, the first notch 102 is formed as a movement locus mark for the crimping roller 106.

Due to the metal material which is pushed out toward the body side rail groove 90, the body side guide rail 100 is pressed toward the side of the upper horizontal surface 96. Therefore, it becomes difficult for the body side guide rail 100 to fall out from the body side rail groove 90.

Preferably, the crimping roller 106 is moved to a location slightly above the body side rail groove 90, whereupon the crimping roller 106 is pressed into the inner surface and is displaced in parallel with the body side rail groove 90 in the same manner as described previously. As a result, a portion of the metal material on the inner surface is pushed out downwardly toward the body side rail groove 90, and the second notch 104 is formed as a movement locus mark for the crimping roller 106. In this case, due to the metal material which is pushed out toward the body side rail groove 90, the body side guide rail 100 is pressed toward the side of the lower horizontal surface 94. More specifically, the body side guide rail 100 is sandwiched between the metal material that has been pushed out. Therefore, it becomes more difficult for the body side guide rail 100 to fall out from the body side rail groove 90.

On the other hand, the slider side rail accommodated portions 142 of the slider side guide rails 140 are fitted into the slider side rail grooves 128 that have been formed beforehand in the slider main body 42. As noted previously, the recessed portions 136 may be filled beforehand with an adhesive.

Figure 6:
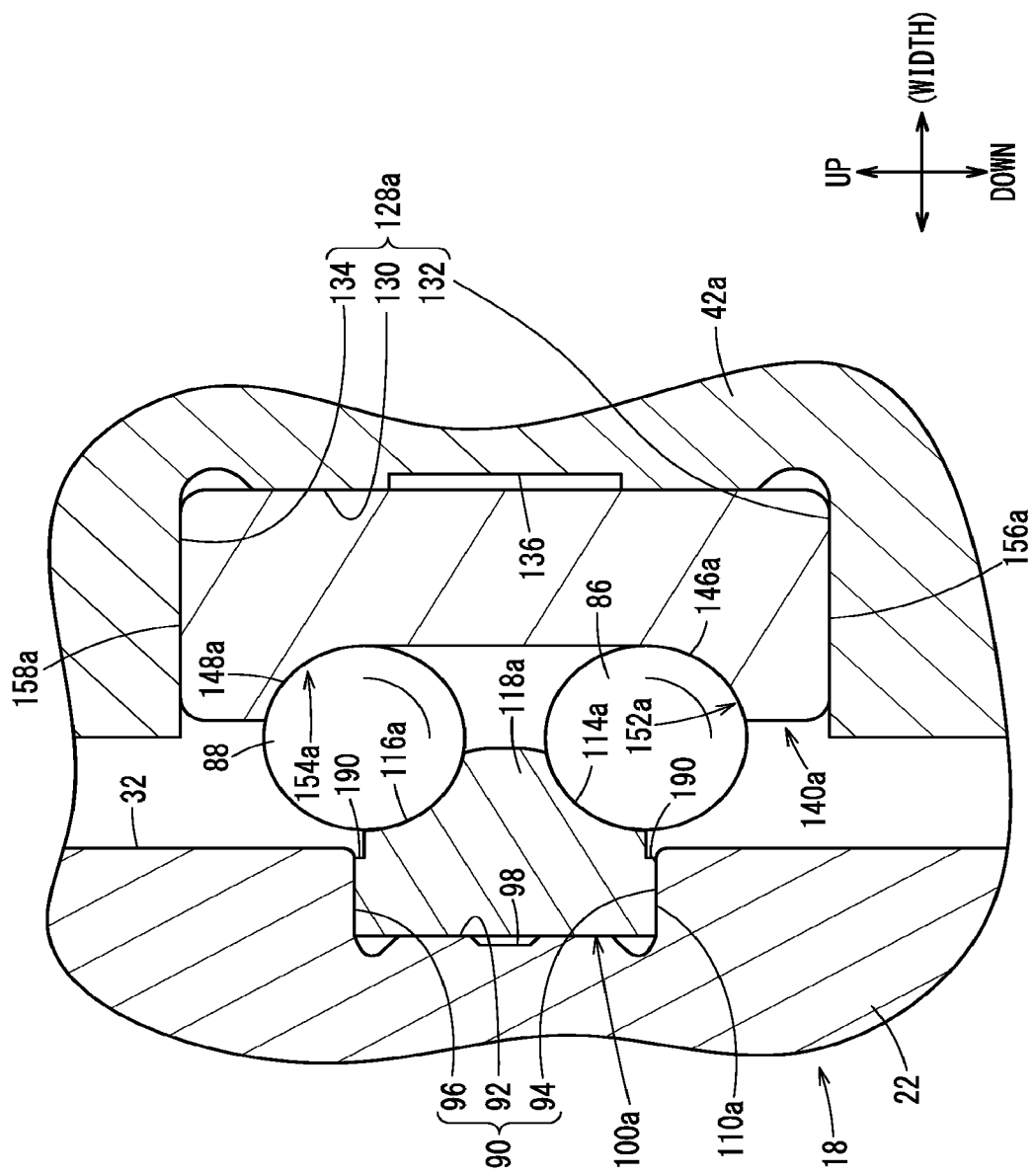
FIG. 6 is a front cross-sectional view of essential components of the actuator in which a step portion is provided on body side guide rails, and inclined portions are not formed on the slider.

In this instance, in FIG. 6, there are shown together a slider side guide rail 140a in which the first depression 160 and the second depression 162 are not formed, and a slider main body 42a on which the inclined portions 164 are not provided. In this case, the elasticity of the slider side guide rail 140a and the slider main body 42a is relatively poor. Accordingly, when the slider side guide rail 140a is fitted into the slider side rail groove 128, a large pressing force is required.

Further, in such a configuration, since the portions of the slider main body 42a in close proximity to a slider side rail groove 128a are thick walled, such portions of the slider main body 42a cannot be folded over a lower surface 156a and an upper surface 158a of the slider side guide rail 140a. In this case, if a portion which is exposed from the slider side rail groove 128a (a slider side rail exposed portion) is provided on the slider side guide rail 140*a*, since the contact area between side surfaces of the slider side rail groove 128*a* and the slider side guide rail 140*a* becomes smaller, a concern arises in that the slider side guide rail 140*a* may fall out from the slider side rail groove 128*a*.

In order to prevent it from falling out, as shown in FIG. 6, the entirety of the slider side guide rail 140*a* may be accommodated inside the slider side rail groove 128*a*. However, in order to do so, it is necessary to cause the portion that forms the slider side rail groove 128*a* to bulge outward in the widthwise direction. Accordingly, in this case, it is not easy to reduce the dimension in the widthwise direction of the slider main body 42*a*.

In contrast thereto, in the first embodiment, the first depressions 160 and the second depressions 162 are formed on the lower surface 156 and the upper surface 158 of the slider side rail accommodated portions 142, facing toward the side surfaces (the lower horizontal surface 132 and the upper horizontal surface 134) of the slider side rail grooves 128 (see FIGS. 2 and 4). If the distal ends of the inclined portions 164 are crimped so as to be crushed, and made to enter the first depression 160 and the second depression 162, the distal ends of the inclined portions 164 serve as stopper portions that block and hold back the slider side guide rails 140. More specifically, the slider side guide rails 140 are prevented from coming out from the slider side rail grooves 128.

Accordingly, in this case, the slider side guide rails 140 can be retained in the slider side rail grooves 128, even if the contact area between the side surfaces of the slider side rail grooves 128 and the slider side guide rails 140 is reduced. By this amount, it is possible to reduce the size of the slider main body 42 in the widthwise direction.

In addition, in the first embodiment, portions of the slider main body 42 in close proximity to the slider side rail grooves 128 are formed as the inclined portions 164. Accordingly, the wall thickness of the slider main body 42 is small in the vicinity of the openings of the slider side rail grooves 128. Therefore, after the slider side guide rails 140 have been fitted into the slider side rail grooves 128, the portions of the inclined portions 164 in close proximity to the openings of the slider side rail grooves 128 can be easily crushed (crimped) toward the sides of the slider side rail grooves 128.

For the above reasons, the pressing force applied to the inclined portions 164 when the inclined portions 164 are subjected to crushing (crimping) can be reduced. In particular, the crimping operation becomes easy to perform.

Further, in the case that guide rails of the same shape as the slider side guide rails 140 are provided in the body 18, and guide rails having the same shape as the body side guide rails 100 are provided in the slider 40, the dimension in the heightwise direction of the first side wall portion 22 and the second side wall portion 23 becomes large. This is because, as noted previously, the dimension H2 in the heightwise direction of the slider side guide rails 140 is larger than the dimension H1 in the heightwise direction of the body side guide rails 100.

In contrast thereto, according to the first embodiment, guide rails (namely, the slider side guide rails 140) having a large dimension in the heightwise direction are provided on the side of the slider 40. Therefore, the dimension in the heightwise direction of the first side wall portion 22 and the second side wall portion 23 can be made as small as possible. Stated otherwise, the size of the body 18 in the heightwise direction can be minimized.

Due to the aforementioned reasons, it is possible to reduce the size of the linear guide 12. In addition, by the amount by which the linear guide 12 is capable of being reduced, it is possible to achieve a reduction in the weight of the actuator 10.

As noted previously, the first circular arc grooves 152 and the second circular arc grooves 154 are formed respectively by the first ball receiving portions 114 and the second ball receiving portions 116 of the body side guide rails 100, and the third ball receiving portions 146 and the fourth ball receiving portions 148 of the slider side guide rails 140. The first balls 86 and the second balls 88 are rotatably accommodated, respectively, in the first circular arc grooves 152 and the second circular arc grooves 154.

When the assembled actuator 10 is operated, a predetermined workpiece is retained via the mounting bolts which are screw-engaged in the mounting holes 84 of the table 46. Furthermore, electrical power is supplied to the motor 14 from a non-illustrated power source. Consequently, the motor shaft and the feed screw shaft 16 rotate, and the displacement nut 52 that is screw-engaged with the feed screw shaft 16 moves forward or rearward.

The slider 40 is connected to the displacement nut 52 via the stud bolt 76 (see FIG. 3). Therefore, the slider 40 moves in the internal space 32 integrally with the displacement nut 52, and by reaching a front end portion or a rear end portion of the body 18, arrives at a displacement end position. It goes without saying that the slider main body 42 also moves in the internal space 32 inside the body 18. Further, the workpiece that is retained on the table 46 exposed to the exterior of the internal space 32 is transported to the front end portion or the rear end portion of the body 18.

During this time, the first balls 86 roll in the first circular arc grooves 152. The first balls 86, which have completed rolling within the first circular arc grooves 152, are returned to the first circular arc grooves 152 through the first U-shaped passages formed in the first return caps 170 (or the third U-shaped passages formed in the second return caps 172), and the first circulation passages 166 formed in the slider main body 42. Similarly, the second balls 88 pass through the second U-shaped passages 182 (or the fourth U-shaped passages 184), and are circulated in the second circular arc grooves 154 and the second circulation passages 168.

The first circular arc grooves 152 and the second circular arc grooves 154 have advantages in that, even if the body side guide rails 100 and the slider side guide rails 140 become bent or warped, an increase in the operating resistance of the first balls 86 and the second balls 88 is suppressed. Therefore, according to the first embodiment, the slider 40 can be easily displaced.

During the above-described operations, a negative pressure is applied to a dust collecting pipe 186 which is disposed inside the body 18. Therefore, dust or the like that is generated within the internal space 32 (inside the body 18) is drawn into the dust collecting pipe 186, and is discharged to the exterior of the actuator 10 through a non-illustrated negative pressure supply port.

Next, an actuator 200 (as well as an actuator 300) according to a second embodiment will be described with reference to FIGS. 8 to 12.

In the second embodiment, a body 202 includes a base portion 204 constituting a substantially flat and elongated bottom portion, and a thick-walled first side wall portion 206 and a thick-walled second side wall portion 208 that are erected on an upper surface of the base portion 204. In addition, by providing a first protective wall portion 210 and a second protective wall portion 212 at upper ends of inner edges of the first side wall portion 206 and the second side wall portion 208, a casing 214 is configured having the body 202, the first protective wall portion 210, and the second protective wall portion 212 (refer especially to FIG. 9). In this manner, according to the second embodiment, the first side wall portion 206 and the first protective wall portion 210 are separate members, and the second side wall portion 208 and the second protective wall portion 212 are also separate members. Stated otherwise, in this case, the side portions of the body 202 are divided in two, into side wall portions and protective wall portions, and the side portions are constituted by combining these members.

In greater detail, an engagement claw member 220 serving as a first engaging portion is provided at an upper end of an inner edge portion of the first side wall portion 206 in a manner so as to extend along the front-rear direction. On the other hand, an engagement groove 222, which is recessed (upwardly) toward the side of the table 46, is formed in a lower end of the first protective wall portion 210 in a manner so as to extend along the front-rear direction. The engagement groove 222 is a second engaging portion, and the engagement claw member 220 is removably inserted therein. Accompanying this insertion, the engagement claw member 220 and the engagement groove 222 are engaged with each other. As a result, the first protective wall portion 210 is detachably connected to and supported on the first side wall portion 206. Concerning the configuration described above, the same features also apply to the second side wall portion 208 and the second protective wall portion 212.

Figure 8:
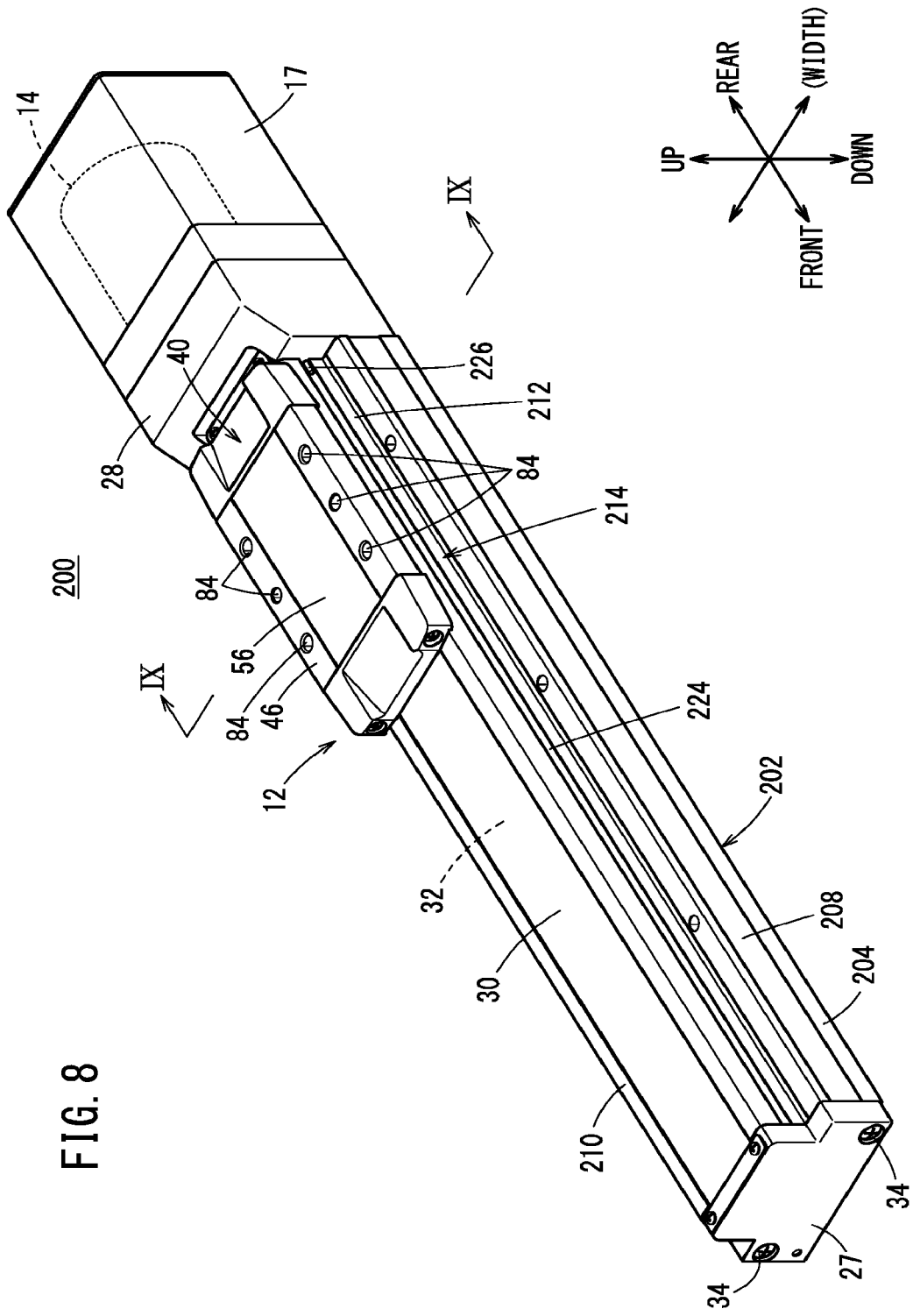
FIG. 8 is a schematic overall perspective view of an actuator according to a second embodiment of the present invention.
Figure 9:
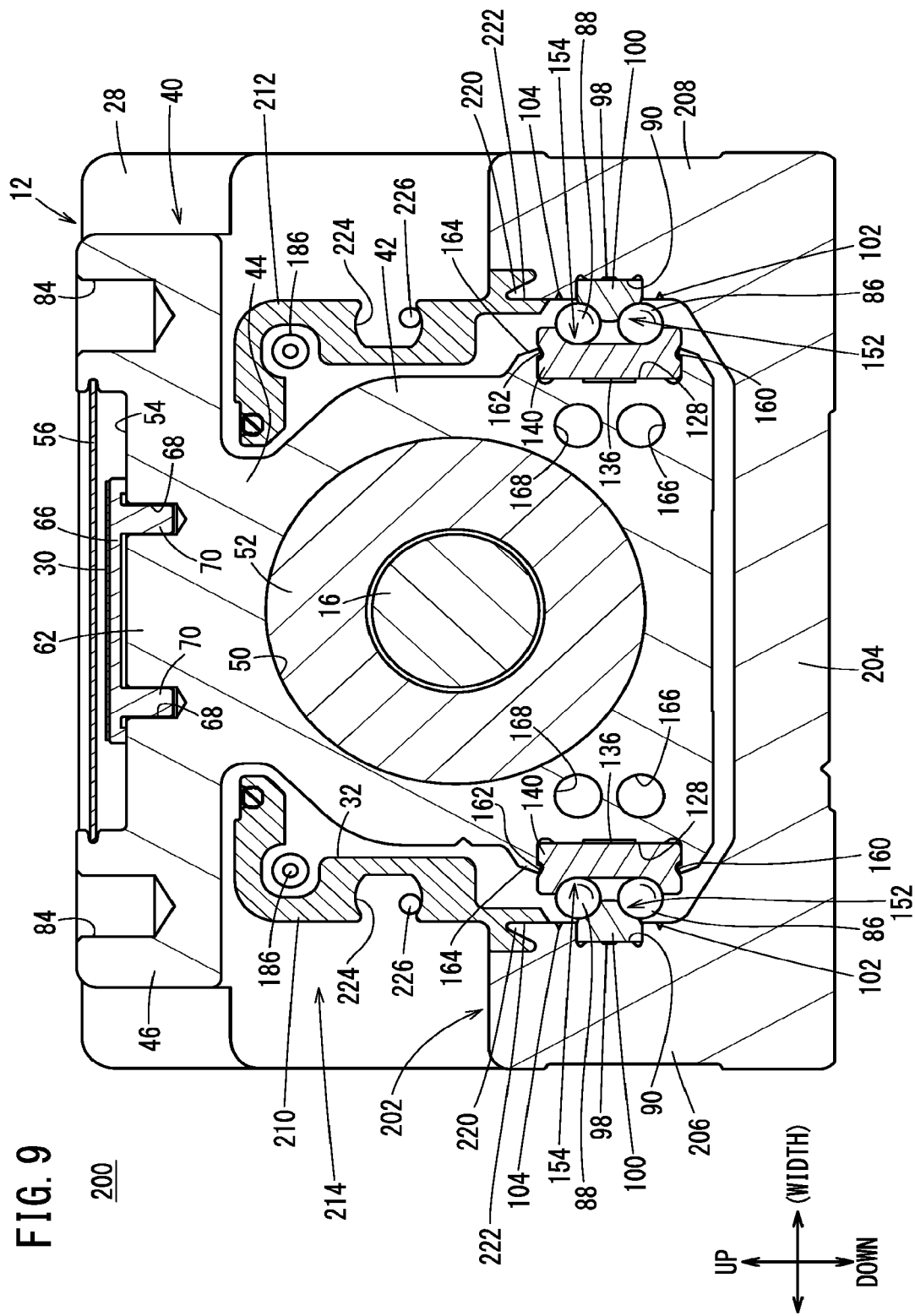
FIG. 9 is a cross-sectional view taken along line IX-IX of FIG. 8.
Figure 10:
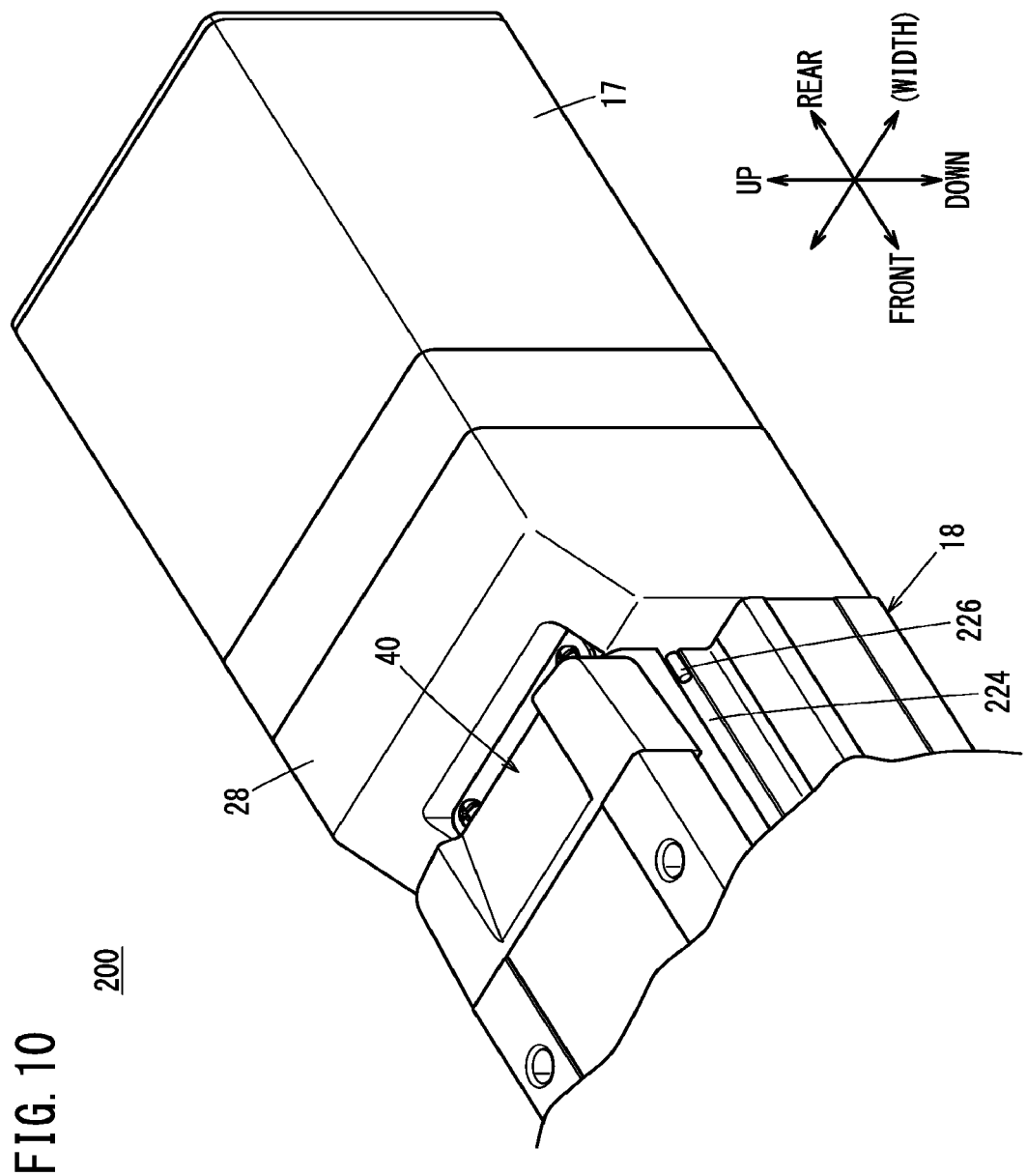
FIG. 10 is an enlarged view of essential components shown in FIG. 8.

In this instance, in the first protective wall portion 210 and the second protective wall portion 212, concave grooves 224 which are recessed toward the internal space 32 are formed. On the other hand, as shown in FIGS. 8 and 10, in the second end plate 28, two protruding portions 226, which are shorter in comparison with the front-rear dimension of the concave grooves 224, are provided on an end surface thereof facing toward the body 202. The protruding portions 226 are each made up, for example, from a pin, one end of which is inserted into a bottomed hole formed in the body 202. Alternatively, pin-shaped portions, which are provided integrally on the second end plate 28, may be used as the protruding portions 226.

The protruding portions 226 enter the concave grooves 224. In addition, the protruding portions 226 come into contact with the lower surfaces of the concave grooves 224 (see FIG. 9). By coming into contact in this manner, the first protective wall portion 210 and the second protective wall portion 212 are pressed by the protruding portions 226. As a result, tilting of the first protective wall portion 210 toward the second protective wall portion 212, and tilting of the second protective wall portion 212 toward the first protective wall portion 210 are effectively prevented. Accordingly, there is no particular requirement to fasten the first side wall portion 206 and the first protective wall portion 210, and the second side wall portion 208 and the second protective wall portion 212 with bolts or the like. However, such members may be fastened with bolts or the like.

Except for the structural features described above, the actuator 200 according to the second embodiment is configured in the same manner as the actuator 10 according to the first embodiment. Accordingly, constituent elements other than those described above are designated with the same reference numerals as those used in FIGS. 1 to 5 and 7.

Actions and effects of the actuator 200 will now be described. First, it goes without saying that the actuator 200 possesses the same actions and effects as those of the actuator 10 according to the first embodiment. Further, with the actuator 200, the following actions and advantageous effects can be realized by providing, as separate members, the first side wall portion 206 and the first protective wall portion 210, as well as the second side wall portion 208 and the second protective wall portion 212.

Figure 11:
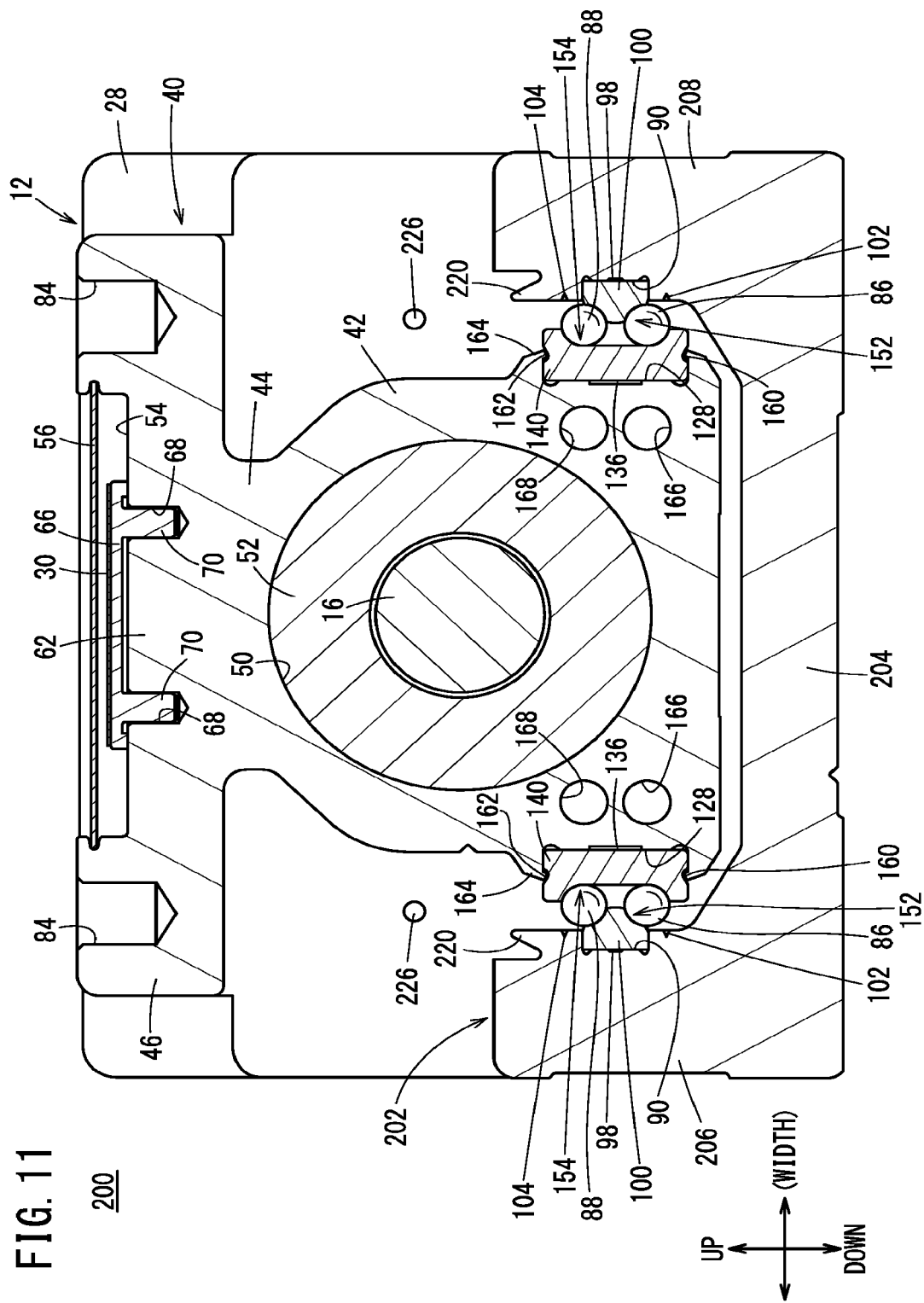
FIG. 11 is a front cross-sectional view showing a state in which a first protective wall portion and a second protective wall portion are removed from FIG. 9.

More specifically, the first protective wall portion 210 can be attached to and removed from the first side wall portion 206, and the second protective wall portion 212 can be attached to and removed from the second side wall portion 208. Accordingly, after having repeatedly used the actuator 200, in the case it is desired to resupply oil to the first balls 86 and the second balls 88 or the feed screw shaft 16 and the like, at least one of the first protective wall portion 210 and the second protective wall portion 212 may be removed from the first side wall portion 206 and the second side wall portion 208. In the case that both the first protective wall portion 210 and the second protective wall portion 212 are removed, the state shown in FIG. 11 is brought about. The operator may carry out lubrication on the second balls 88, for example, from between the first side wall portion 206 and the slider side guide rail 140, or between the second side wall portion 208 and the slider side guide rail 140. Of course, maintenance other than lubrication, for example, cleaning, may also be performed.

In this manner, according to the second embodiment, it is unnecessary to carry out disassembly in addition to removing at least one of the first protective wall portion 210 and the second protective wall portion 212 from the first side wall portion 206 and the second side wall portion 208. Therefore, maintenance can be easily performed on the actuator 200.

Figure 12:
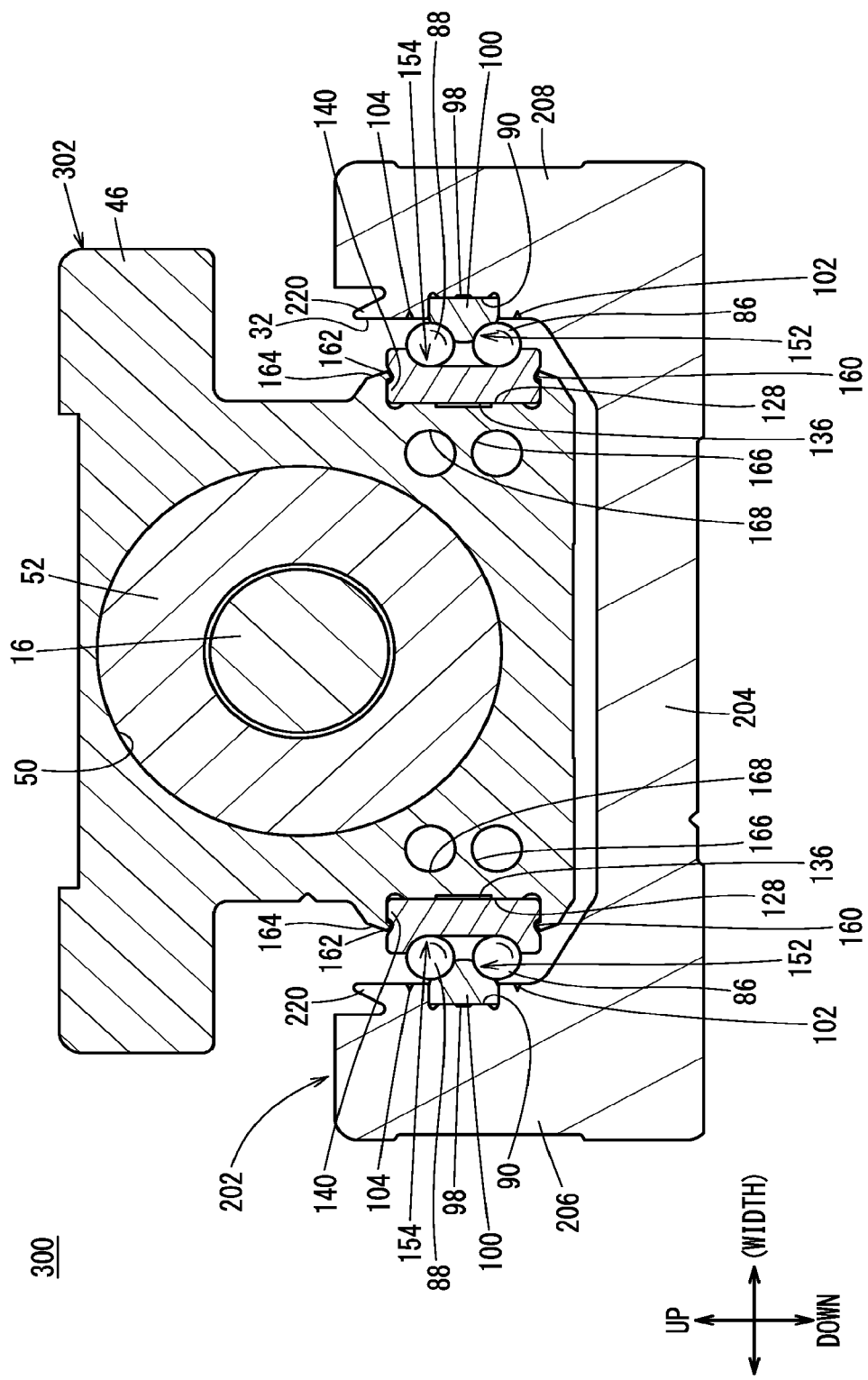
FIG. 12 is a front cross-sectional view showing a state in which the slider in FIG. 10 is replaced by another slider.

Furthermore, in the case that the seal band 30 is unnecessary, as shown in FIG. 12, the actuator 300 may be configured without providing the first protective wall portion 210 and the second protective wall portion 212 on the body 202. In this case, the dimension in the heightwise direction of a slider 302 can be set to be slightly greater than the dimension in the heightwise direction of the first side wall portion 206 and the second side wall portion 208. More specifically, the dimension in the heightwise direction of the slider 302 can be made smaller than that of the slider 40, by an amount due to the first protective wall portion 210 and the second protective wall portion 212 not existing.

As can be understood from the foregoing, according to the second embodiment, the body 202 is capable of accommodating either one of the slider 40 or the slider 302. More specifically, the versatility of the body 202 is enhanced. Further, in the case that the slider 302 is adopted, the actuator 300 can be configured as one having a smaller height, or stated otherwise, as having a smaller size than that of the actuators 10 and 200. Moreover, with the actuator 300, the internal space 32 is defined by the body 202, and more specifically, by the base portion 204, the first side wall portion 206, and the second side wall portion 208.

The present invention is not particularly limited to the first embodiment and the second embodiment described above, and various modifications may be adopted therein without departing from the essence and gist of the present invention.

For example, the body side guide rails 100 and the slider side guide rails 140 may be retained via an adhesive in the body side rail grooves 90 and the slider side rail grooves 128. In this case, there is no particular need to perform crimping on the first side wall portion 22, the second side wall portion 23, or the inclined portions 164.

Further, the number of each of the body side ball receiving portions and the slider side ball receiving portions may be one on each side, and the number of the circular arc grooves that are formed in the upward/downward direction may be one on each side.

What is claimed is:

1. An actuator, comprising:
    a body including a base portion, and a first side wall portion and a second side wall portion provided on the base portion and facing toward each other, an internal space being defined by the base portion, the first side wall portion, and the second side wall portion;
    a slider having a portion that moves inside the internal space; and
    a table provided on the slider and configured to be exposed from the internal space,
    wherein each of the first side wall portion and the second side wall portion includes a body side rail groove provided on a surface thereof, the surfaces facing toward the internal space,
    slider side rail grooves are formed respectively on surfaces of the slider that face toward the body side rail grooves,
    body side guide rails are disposed in the body side rail grooves, and slider side guide rails are disposed in the slider side rail grooves,
    the body side guide rails include body side rail accommodated portions accommodated in the body side rail grooves, and body side ball receiving portions configured to be exposed from the body side rail grooves and curved in an arc shape,
    the slider side guide rails include slider side rail accommodated portions accommodated in the slider side rail grooves, and slider side ball receiving portions configured to be exposed from the slider side rail grooves, and forming circular arc grooves together with the body side ball receiving portions,
    balls are retained in the circular arc grooves, and the slider is provided with circulation passages configured to allow the balls to be circulated therein, and
    a dimension of the slider side guide rails in a vertical direction perpendicular to a direction of movement of the slider is greater than a dimension of the body side guide rails in the vertical direction perpendicular to the direction of movement of the slider,
    wherein the body side guide rails include first ball receiving portions and second ball receiving portions serving as the body side ball receiving portions, and also include protruding end portions interposed between the first ball receiving portions and the second ball receiving portions and configured to project toward the slider side guide rails,
    the slider side guide rails include third ball receiving portions and fourth ball receiving portions serving as the slider side ball receiving portions, and also include flat portions interposed between the third ball receiving portions and the fourth ball receiving portions, and
    as the circular arc grooves, first circular arc grooves are formed between the first ball receiving portions and the third ball receiving portions arranged at positions lower than the first ball receiving portions, and second circular arc grooves are formed between the second ball receiving portions and the fourth ball receiving portion arranged at positions higher than the second ball receiving portions.

2. The actuator according to claim 1, wherein notches extending along the direction of movement of the slider are formed in a vicinity of the body side guide rails.

3. The actuator according to claim 2, wherein, as the notches, first notches and second notches configured to sandwich the body side guide rails therebetween are formed.

4. The actuator according to claim 1, wherein first depressions and second depressions are formed on surfaces of the slider side rail accommodated portions, the surfaces facing toward side surfaces of the slider side rail grooves.

5. The actuator according to claim 1, wherein portions of the slider on which the slider side rail grooves are formed are inclined portions having a thickness that decreases as the inclined portions become closer in proximity to openings from bottom surfaces of the slider side rail grooves.

6. The actuator according to claim 1, wherein the body side guide rails have regions located between the body side rail accommodated portions and the body side ball receiving portions and formed as inclined surfaces which are inclined in a manner so that a wall thickness of the body side guide rails decreases as the regions become closer in proximity to the body side ball receiving portions from the body side rail accommodated portions.

7. The actuator according to claim 1, wherein recessed portions are formed in bottom surfaces of at least the body side rail grooves or the slider side rail grooves.

8. The actuator according to claim 1, wherein the body and the slider are made of aluminum or an aluminum alloy, and the body side guide rails and the slider side guide rails are made of an iron based metal.

9. The actuator according to claim 8, wherein the body side guide rails and the slider side guide rails are made of stainless steel.

10. The actuator according to claim 1, further comprising a first protective wall portion and a second protective wall portion that are provided respectively on the first side wall portion and the second side wall portion in a manner so as to extend toward the table, and that define the internal space together with the first side wall portion and the second side wall portion,
    wherein the first protective wall portion is detachably connected to the first side wall portion, and the second protective wall portion is detachably connected to the second side wall portion.

11. The actuator according to claim 10, wherein a first engaging portion is provided on each of the first side wall portion and the second side wall portion, and a second engaging portion is provided on each of the first protective wall portion and the second protective wall portion, and by the first engaging portions and the second engaging portions engaging with each other, the first protective wall portion and the second protective wall portion are detachably connected, respectively, to the first side wall portion and the second side wall portion.

12. The actuator according to claim 10, further comprising a first end plate and a second end plate arranged at end portions in the direction of movement of the slider,
    wherein concave grooves, which are recessed toward a side of the internal space, are formed in the first protective wall portion and the second protective wall portion, at locations midway from the first side wall portion and the second side wall portion to the table, and protruding portions configured to enter the concave grooves are provided on the first end plate or the second end plate.

* * * * *